United States Patent

Jayawardena et al.

[11] Patent Number: 6,044,092
[45] Date of Patent: Mar. 28, 2000

[54] METHOD AND APPARATUS FOR PERFORMING AUTOMATIC SYNCHRONIZATION FAILURE DETECTION IN AN ATM NETWORK

[75] Inventors: Thusitha Jayawardena, Howell; Luis E. Morales, Freehold, both of N.J.

[73] Assignee: AT&T Corp., New York, N.Y.

[21] Appl. No.: 08/872,749

[22] Filed: Jun. 11, 1997

[51] Int. Cl.[7] ............................. H04J 3/06; H04L 7/00; H04L 12/56
[52] U.S. Cl. ...................... 370/516; 370/395; 375/371
[58] Field of Search ................... 370/503, 505, 370/506, 516, 517, 395, 465, 412; 375/371, 354

[56] References Cited

U.S. PATENT DOCUMENTS

| | | | |
|---|---|---|---|
| 5,260,978 | 11/1993 | Fleischer et al. | 375/354 |
| 5,396,492 | 3/1995 | Lien | 370/412 |
| 5,694,397 | 12/1997 | Burton | 370/516 |
| 5,742,649 | 4/1998 | Muntz et al. | 375/371 |

Primary Examiner—Hassan Kizou
Assistant Examiner—John Pezzlo

[57] ABSTRACT

By recognizing that it is not necessary to identify a synchronization failure immediately when the failure occurs, but rather not until the failure results in a detectable difference, the method and system described herein can distinguish between Cell Delay Variation (CDV) and loss of synchronization. Because CDV will have a larger effect on the stability than a failure of the frequency recovery system at the precise moment of the failure, a synchronization failure cannot usually be distinguished from CDV for several minutes or hours, depending upon the stability of the reference clock. The present invention monitors a fill level of a play-out buffer in the ATM network, and attempts to determine if a variation in the fill level is linear with time, which is indicative of a synchronization failure. Upon detecting such a failure, the method of the present invention switches to an adaptive method for frequency recovery. If the variation in the fill level of the play-out buffer is not linear, but an underflow/overflow (or slip) has occurred, then the method of the present invention can inform an intelligent buffer control that the underflow/overflow is not due to the presence of a synchronization failure, which enables the intelligent buffer controller to take appropriate action.

20 Claims, 3 Drawing Sheets

METHOD AND APPARATUS FOR PERFORMING AUTOMATIC SYNCHRONIZATION FAILURE DETECTION IN AN ATM NETWORK

BACKGROUND OF THE INVENTION

The present invention relates generally to methods and apparatuses for performing detection of synchronization failure, and more particularly to a method and apparatus for performing detection of synchronization failure in an Asynchronous Transfer Mode (ATM) network.

Within an ATM network, the ATM Adaptation Layer (AAL) is responsible for performing conversions from non-ATM traffic to ATM traffic, and vice versa That is, signal traffic that enters the ATM network in non-packetized form must be converted into packets, each which are transmitted separately over the ATM network and then the original signal is reconstructed at the terminal of the ATM network. The ATM Adaptation Layer type 1 (AAL1) performs this conversion for Constant-Bit-Rate (CBR) signals. Private line service traffic is an excellent example of a CBR signal. A critical function of the AAL1 protocol is the recovery of the original frequency of the CBR signal at the egress node of the ATM network. The signals enter the ATM network at some nominal frequency, e.g., approximately 1.544 Megabits per second (Mb/s) for DS1s. The signals must be output from the ATM network at the same nominal frequency.

There are several methods for recovering the nominal frequency at the egress node of the network. Two of the most commonly employed techniques are the Synchronous Residual Time Stamp (SRTS) method, and the adaptive method.

Among the various frequency recovery schemes that have been implemented, the Synchronous Residual Time Stamp (SRTS) scheme has several advantages and it is implemented in ATM switches of many vendors. Furthermore, SRTS is the only frequency recovery scheme supported by the American National Standards Institute (ANSI). As a result, SRTS is the preferred frequency recovery scheme of most vendors.

The other frequency recovery method used in this application is the so-called adaptive method. The adaptive method recovers the original frequency from the cells (i.e., packets) as they are output from the network to the terminal node. By monitoring the rate at which the cells exit the ATM network, the adaptive method recovers the original frequency of the CBR signal, similar to a phase lock loop that recovers the frequency of the signal from the incoming data. Because the adaptive method assumes that the ATM network has not added variations that are significant relative to the frequency of the CBR signal, the resulting recovered frequency is not always accurate, especially during congested periods, during which time the ATM network can add relatively significant delay variation to the packets, which is known as Cell Delay Variation (CDV). Consequently, the rate of the outgoing cells may be significantly different than the rate of the incoming cells due to delays in the network. As a result, the adaptive method is susceptible to CDV, while SRTS is immune to it as long as the play-out buffer is large enough to absorb the CDV.

In order to use the SRTS frequency recovery scheme, however, a common clock has to be available at both the ingress and egress nodes of the ATM network. This common clock is used to encode the frequency of the CBR signal at the ingress node on to the AAL 1 overhead byte carried by cells and to reconstruct the frequency of the CBR signal at the egress node of the ATM network. When the common network clock is lost due to synchronization failures at either the ingress or egress ATM node, the reconstructed frequency of the CBR signal will be different from the original frequency of the CBR signal. Such a difference will cause buffers to underflow/overflow (slip) and will result in loss of data.

The present invention is therefore directed to the problem of developing a method and apparatus for automatically detecting a synchronization failure in an ATM network.

SUMMARY OF THE INVENTION

The present invention solves this problem by first recognizing that it is not necessary to identify a synchronization failure immediately when the failure occurs, but rather not until the failure results in a detectable difference and then not taking corrective action until the degradation becomes problematic. Because Cell Delay Variation (CDV) will have a larger effect on the frequency stability than a failure of the synchronization system at the precise moment of the failure, the synchronization failure cannot be distinguished from CDV for several minutes or hours, depending upon the stability of the reference clock. Upon detecting a synchronization failure, the present invention switches to the adaptive synchronization method to enable operation through the synchronization failure without serious degradation. Yet, even if one was to switch from the SRTS frequency recovery system to the adaptive frequency recovery system at the precise moment of the synchronization failure (assuming one could even detect that moment), the result might be worse than operating the ATM network with the SRTS system despite the synchronization system failure. The present invention therefore combines switching to the alternative synchronization method with waiting until the existing synchronization method has degraded to the point that switching will improve the performance of the system rather than further degrading performance.

To detect the presence of a synchronization failure, the present invention monitors the fill level of the play-out buffer in the egress node of the ATM network, and attempts to determine if a variation in the fill level is linear with time, which is indicative of a synchronization failure. Upon detecting such a failure, the method of the present invention then switches to the adaptive method for synchronization, or any alternative synchronization method available at the time. If the variation in the fill level of the play-out buffer is not linear, but an underflow/overflow (or slip) has occurred, then the method of the present invention can inform an intelligent buffer control scheme that the underflow/overflow that has occurred is not due to the presence of a synchronization failure but due to CDV, which enables the intelligent buffer controller to take appropriate action.

DETAILED DESCRIPTION

Figure 1:
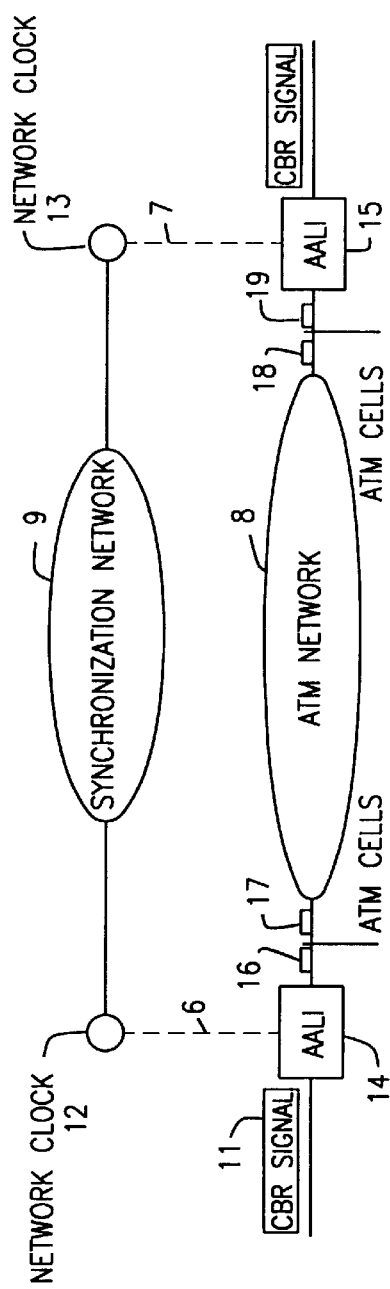
FIG. 1 depicts a constant-bit-rate signal carried over an ATM network, which is the field in which the present invention is applied.

The present invention reduces the problem of attempting to distinguish between Cell Delay Variation (CDV) and a synchronization failure to recognizing that it is more effective to wait until the effect of a synchronization failure has grown to the point where the existence of a synchronization failure is now distinguishable from CDV, which otherwise would mask the failure, than to attempt to determine exactly when a synchronization failure has occurred. Furthermore, the present invention recognizes that it is not necessary to take corrective action until the synchronization failure has actually resulted in a detectable effect on the synchronization.

The present invention monitors the fill level of a play-out buffer in the egress node of the ATM network, and attempts to determine if a variation in the fill level is linear with time, which is indicative of a synchronization failure. One technique for making this determination is to attempt to fit a line to a set of fill level variation data. Many approaches for fitting a line to data exist, e.g., such as the least squares method, any of which will suffice.

Another approach for determining whether the variation in the fill level of the play-out buffer is linear or random is to measure the time between slips in the play-out buffer. If the time between slips is constant, then the variation is linear.

Upon detecting such a failure, the method of the present invention switches to the adaptive method, or any alternate frequency recovery method available at the time. If the variation in the fill level of the play-out buffer is not linear, but an underflow/overflow (or slip) has occurred, then the method of the present invention can inform the intelligent buffer control that the underflow/overflow is not due to the presence of a synchronization failure, which enables the intelligent buffer controller to take the appropriate action, such as resetting the buffer center, extending the length of the buffer, etc.

Once a synchronization failure is detected, a frequency recovery scheme that does not rely on a common network clock can be used for the duration of the synchronization failures. The problem of detecting synchronization failures is assumed to be difficult because CDV encountered inside an ATM network can mask synchronization failures and also because the statistical nature of CDV is not well understood.

In addition to knowing when to switch to an alternate frequency recovery scheme, the proposed invention has other benefits: The play-out buffer of a CBR connection is the last buffer in the egress ATM switch, and it is where the CBR signal is re-created. The fill level of this play-out buffer varies due to both CDV and synchronization failures. By having larger play-out buffers, larger magnitudes of CDV can be absorbed without buffer underflows/overflows. However, larger play-out buffers result in longer absolute delays. Therefore, CDV on one hand and absolute delays on the other dictate lower and upper limits for the optimum size of the play-out buffer. If there was a way to distinguish buffer underflows/overflows caused by CDV from those caused by synchronization failures, the play-out buffer could be controlled intelligently during underflow/overflow events. Buffer control is the logic that determines how to reset the fill-level of the play-out buffer after an overflow/ underflow event has occurred. For the best use of the play-out buffer, the reset fill-level position should be chosen depending on whether the overflow/underflow event was caused by CDV or a synchronization failure.

Summarizing, the proposed mechanism to detect synchronization failures will have at least two important uses:

1) alternate frequency recovery: If a synchronization failure is detected, an alternate frequency recovery scheme (i.e., other than SRTS, for example, the adaptive method, or any other method available at the time) can be used for the duration of the failure. This will prevent or minimize CBR performance problems that would otherwise occur during such failures due to the SRTS implementation.

2) Intelligent Play-out buffer control: If an overflow/ underflow event has occurred, the detection mechanism can be used to determine if the overflow/underflow occurred due to a synchronization failure or excessive CDV. Thus, the present invention allows the buffer control scheme to take actions needed to prevent or minimize the subsequent buffer spills.

The detection algorithm of the present invention will differentiate between synchronization failures and excessive CDV when such a differentiation has a measurable impact. In other words, when the synchronization failure produces only a marginal degradation of the recovered frequency there is no reason to switch to another frequency recovery scheme. At some point, depending on the quality of the network clocks, the synchronization failure will produce substantial degradation in the recovered frequency. And that is when the present invention recommends switching to an alternate source of synchronization.

The present invention is so portable that is can be installed on most existing ATM hardware by means of a simple software firmware upgrade. It takes advantage of hardware components that are already being used to support other frequency recovery functions. The algorithm itself runs in the microprocessor supporting the AAL1 functions. The input to the detection mechanism consists of periodic readings of the play-out buffer fill level. Then, these fill level readings are processed to produce a time varying mask from which simple logic will determine the type of failure. The output of the algorithm is an indication of whether the failure is synchronization related or not.

The detection algorithm can enhance the reliability of AT&T's CBR signals carried over an ATM backbone. Coupled with an intelligent buffer control scheme, the detection algorithm can also enhance the performance of CBR signals during congestion. Such a detection scheme is valuable to other carriers entering the ATM arena, who unlike the assignee of the present application, cascade timing and use sub-premium clocks in their synchronization networks because they will be very vulnerable to synchronization failures.

The present invention is useful to anyone interesting in building the added reliability and enhanced performance into their AAL1 modules. An AAL1 module is needed for every DS1 or DS3 signal circuit-emulated for transport over an ATM backbone. Just within the assignee of the present application, there is an initiative currently underway to migrate all data services (ATM, Frame Relay, Internet and Private line) to a single ATM network infrastructure beginning in 1998. Once completed, an estimated 15,000 private line DS Is will be supported over the ATM infrastructure. The addition of the failure detection algorithm of the present invention will deliver a level of CBR service whose reliability and performance is superior to ATM implementation currently in use.

Referring to FIG. 1, a constant-bit-rate (CBR) signal 11 enters the ATM network 8. The ATM network is maintained in synchronization by a separate and distinct synchronization network 9. The CBR signal 11 is converted into packets 16, 17 by the AAL1 module 14, which does so based on the synchronization provided by the synchronization network 9. The synchronization network 9 uses an extremely stable clock 6, 7 at each end. The packets 16, 17 are then sent over the ATM network 9 and arrive at the other end, where they (i.e., arriving packets 18, 19) are reconstructed by the second AAL I module 15 into the original CBR signal 11. The second AAL1 module 15 uses a synchronization signal 7 provided by the synchronization network 9. This is also a very stable clock 7.

Figure 2:
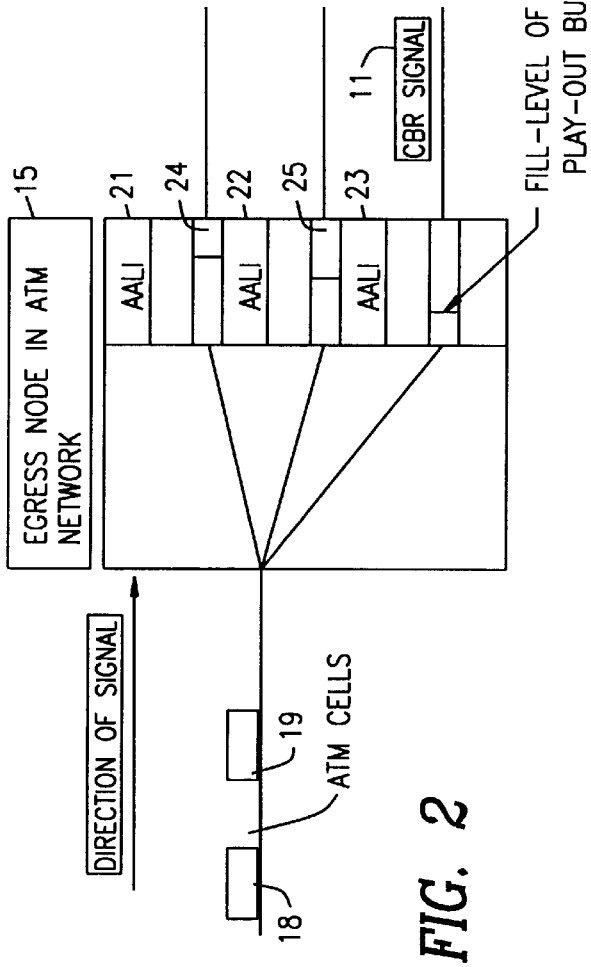
FIG. 2 depicts a recreation of the constant-bit-rate signal at the egress node of the Asynchronous Transfer Mode (ATM) network.

Referring to FIG. 2, at the egress node 15 of the ATM network 8, the ATM cells 18, 19 enter the AAL1 module 15, where they are placed in the play-out buffers 21–23. The fill level 24–26 of the play-out buffers 21–23 often varies based on the CBR signal 11 itself or the frequency stability. By distinguishing between a random (or non-linear) variation in the fill level versus a linear variation with time one can determine whether the variation is due to a synchronization failure or CDV. A synchronization failure will lead to a linear variation with time, whereas CDV will lead to a random variation in the fill level 24–26 of the play-out buffer 21–23.

Once a synchronization failure has been detected, the present invention then switches to the adaptive synchronization method. While this method will be less stable than the SRTS method, it is sufficiently stable to enable the ATM network 8 to operate during a synchronization failure. In fact, any available alternate frequency recovery method is suitable at this point, as the present invention has identified the presence of a degradation in frequency stability that is sufficiently large to warrant adjustment.

Perhaps the best result of the present invention is that it can distinguish between the presence of a frequency synchronization error and large CDV that causes a slip in the play-out buffer. This permits the intelligent buffer controller to modify the length of the play-out buffer or to reset the play-out buffer center to correct for CDV or to not change anything with the play-out buffer as the problem lies in the synchronization portion of the ATM network.

Figure 3:
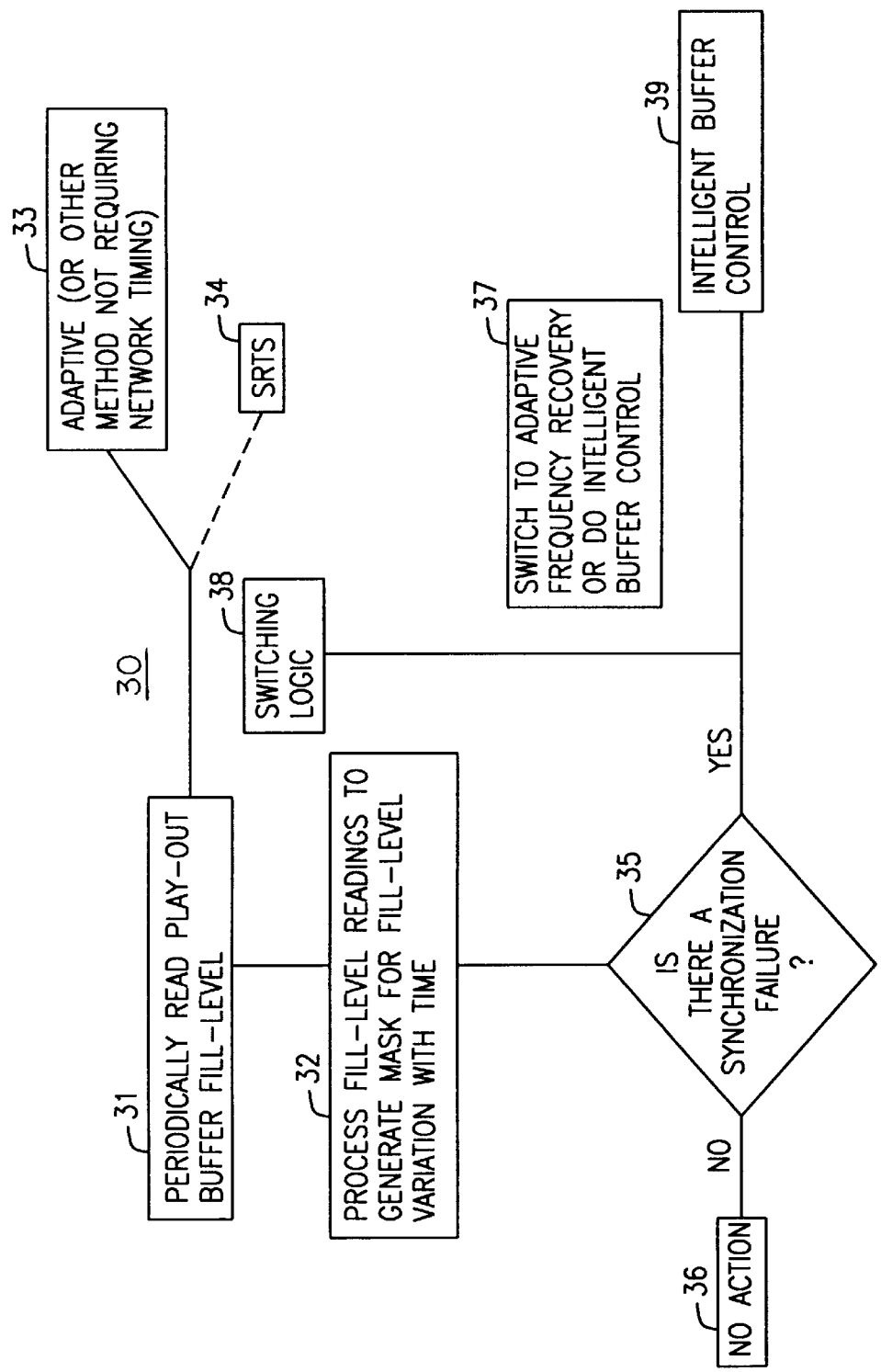
FIG. 3 depicts a flow chart of the method of the present invention.

Turning to FIG. 3, which depicts the method of the present invention in flow chart format 30, the fill-level of the play-out buffer is periodically read in the first step 31. Next, the fill-level readings are processed to generate a mask for fill-level variation with time in step 32. A decision point 35 then queries whether there is a synchronization failure based on whether the fill-level variation is linear with time or not. A variation in the fill level of the play-out buffer that is linear with time is indicative of a synchronization failure. If there is no synchronization failure, no action is required 36. If there is a synchronization failure then switching logic 38 switches the frequency recovery method to the adaptive frequency recovery method 37 or in the alternative, intelligent buffer control is performed 39.

Figure 4:
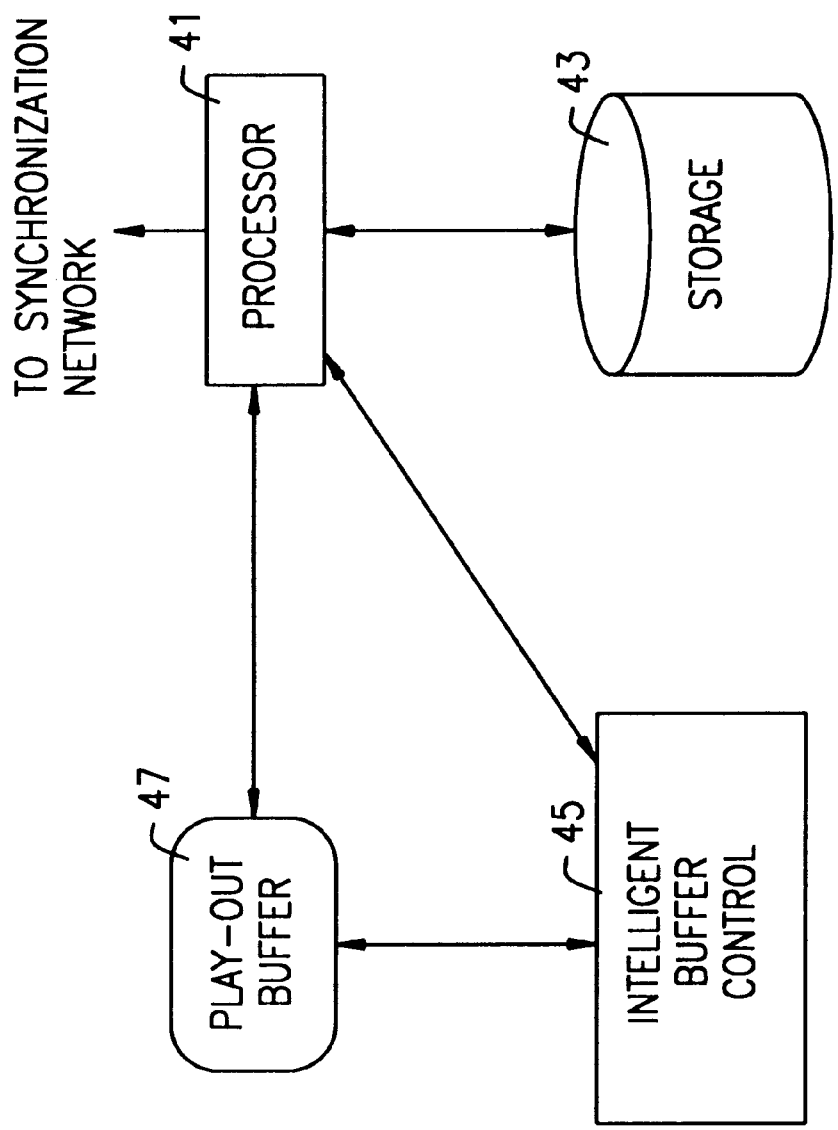
FIG. 4 depicts one possible embodiment of an apparatus according to the present invention.

FIG. 4 depicts one possible embodiment for implementing the method of the present invention. The apparatus 40 includes at least a processor 41 with storage 43, which is coupled to the intelligent buffer control 45 and the play-out buffer 47. The processor 41 periodically polls the play-out buffer 47 for fill-level variation data. Upon receipt of this data, the processor stores it in the database 43, and attempts to fit a line to the data to determine if the variation is linear with time. Either in response to a query from the intelligent buffer control 45 or simply upon detection of a slip (underflow/overflow), the processor 41 indicates to the intelligent buffer control 45 whether the slip was due to a synchronization failure or CDV. Obviously, the intelligent buffer control can then take whatever action it deems appropriate if the slip is not due to a synchronization failure. If the processor detects a synchronization failure, it then outputs a signal to the synchronization network that indicates the presence of a failure and commands the synchronization network to switch to the alternate frequency recovery method. The logic for switching to the adaptive method exists within the egress ATM node. Instead of a message to the synchronization network, an alarm could be generated and a human operator can take over the problem of determining whether the egress or the ingress node clock has the synchronization failure.

What is claimed is:

1. A method for automatically detecting a synchronization failure in an ATM network, comprising the steps of:
    a) determining whether a variation in a fill level of a play-out buffer in an egress node of the ATM network is substantially linear; and
    b) switching to an alternate frequency recovery method for the ATM network if the determination in step a) is that the variation is substantially linear.

2. The method according to claim 1, wherein the primary frequency recovery method comprises a Synchronous Residual Time Stamp (SRTS) method.

3. The method according to claim 1, wherein the alternate frequency recovery method comprises an adaptive method.

4. The method according to claim 1, wherein the primary frequency recovery method comprises a Synchronous Residual Time Stamp (SRTS) method and the alternate frequency recovery method comprises an adaptive method.

5. The method according to claim 1, wherein the alternate source of synchronization comprises a very stable clock source.

6. The method according to claim 1, further comprising the step of:
    c) polling periodically the play-out buffer to determine the fill level; and
    d) comparing a current fill level to previously obtained data regarding the variation of the fill level of the play-out buffer.

7. The method according to claim 1, further comprising the step of:
    c) storing fill level data obtained from the play-out buffer in a memory.

8. A method for automatically detecting synchronization failures, comprising the steps of:
    a) periodically reading a play-out buffer fill level;
    b) processing the fill level readings to generate a mask for fill level variation with time; and
    c) determining whether current fill level variation is generally linear based on the mask generated in step b).

9. The method according to claim 8, further comprising the step of:
    d) switching to an alternate frequency recovery system upon determining that the fill level variation is linear in step c).

10. The method according to claim 8, further comprising the step of:
    d) performing intelligent buffer control upon determining that the fill level variation is generally linear.

11. The method according to claim 8, further comprising the step of:
    d) indicating to an intelligent buffer controller whether a buffer underflow/overflow is related to a synchronization failure or not.

12. An apparatus for automatically detecting a synchronization failure in an ATM network, comprising:
    a) a processor; and
    b) a play-out buffer, said play-out buffer being coupled to the processor, wherein the processor monitors a fill level of the play-out buffer and determines whether a variation in the fill level is linear, and if so, the processor outputs a signal indicating that a synchronization failure has occurred.

13. The apparatus according to claim 12, further comprising a primary source of synchronization and an alternate source of frequency recovery, wherein the primary source of frequency recovery maintains synchronization of the ATM network, the alternate source of frequency recovery is coupled to the processor and operates under the control of the processor, and upon detection by the processor of a synchronization failure, the processor activates the alternate source of frequency recovery.

14. The apparatus according to claim 13, wherein the primary source of frequency recovery is based on the Synchronous Residual Time Stamp (SRTS) scheme.

15. The apparatus according to claim 13, wherein the alternate source of frequency recovery is based on an adaptive method.

16. The apparatus according to claim 13, wherein the primary source of frequency recovery is based on the Synchronous Residual Time Stamp (SRTS) scheme and the alternate source of frequency recovery is based on an adaptive method.

17. The apparatus according to claim 13, wherein the alternate source of frequency recovery is based on a very stable clock source.

18. The apparatus according to claim 12, wherein the processor periodically polls the play-out buffer to determine the fill level and compares this to previously obtained data regarding the fill level of the play-out buffer.

19. The apparatus according to claim 12, further comprising a memory coupled to the processor and storing fill level data obtained from the play-out buffer by the processor.

20. The apparatus according to claim 12, further comprising an intelligent buffer controller coupled to the play-out buffer, wherein upon the detection by the processor of a synchronization failure, the intelligent buffer controller controls the fill level of the play-out buffer to maintain synchronization.

* * * * *